United States Patent
Staehlin

(10) Patent No.: US 11,175,412 B2
(45) Date of Patent: Nov. 16, 2021

(54) VEHICLE-TO-X COMMUNICATION SYSTEM

(71) Applicant: Continental Teves AG & Co. oHG, Frankfurt am Main (DE)

(72) Inventor: Ulrich Staehlin, Eschborn (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 682 days.

(21) Appl. No.: 15/782,173

(22) Filed: Oct. 12, 2017

(65) Prior Publication Data

US 2018/0106907 A1 Apr. 19, 2018

(30) Foreign Application Priority Data

Oct. 13, 2016 (DE) ...................... 10 2016 219 932.3

(51) Int. Cl.
*G08G 1/16* (2006.01)
*H01Q 1/32* (2006.01)
*H04B 1/3822* (2015.01)
*H04L 29/08* (2006.01)
*G01S 19/42* (2010.01)

(52) U.S. Cl.
CPC .............. *G01S 19/42* (2013.01); *G08G 1/161* (2013.01); *G08G 1/164* (2013.01); *G08G 1/165* (2013.01); *G08G 1/166* (2013.01); *H01Q 1/3291* (2013.01); *H04B 1/3822* (2013.01); *H04L 67/12* (2013.01); *B60W 2556/45* (2020.02); *H01Q 1/3208* (2013.01)

(58) Field of Classification Search
CPC .. H01Q 1/3291; H04L 67/12; B60W 2556/45; G08G 1/164
See application file for complete search history.

(56) References Cited

U.S. PATENT DOCUMENTS

| | | | |
|---|---|---|---|
| 2016/0212797 A1 | 7/2016 | Scherping et al. | |
| 2017/0012657 A1 | 1/2017 | Staehlin et al. | |
| 2018/0034144 A1* | 2/2018 | Schilling | G08G 1/096791 |
| 2018/0341005 A1* | 11/2018 | Yoo | H01Q 1/3233 |
| 2019/0089419 A1* | 3/2019 | Kim | H01Q 1/325 |

FOREIGN PATENT DOCUMENTS

| | | | |
|---|---|---|---|
| DE | 102015202625 A1 | 8/2015 | |
| DE | 102014018672 A1 | 6/2016 | |
| WO | 2015/121404 A1 | 8/2015 | |
| WO | WO-2015121404 A1 * | 8/2015 | ............. G08G 1/161 |

OTHER PUBLICATIONS

English Abstract of DE 10 2014 018 672 A1.
DE Search Report issued by the German Patent and Trademark Office dated Jun. 2, 2017.

* cited by examiner

Primary Examiner — Ricardo I Magallanes

(57) ABSTRACT

The present invention relates to a vehicle-to-X communication system for a vehicle. The vehicle-to-X communication system comprises a first communication module having a first antenna, wherein the first antenna has a first communication angle; a second communication module having a second antenna, wherein the second antenna has a second communication angle; wherein the first communication module and the second communication module are arranged in such a manner that the first antenna and the second antenna are oriented in different directions, in order to obtain a total communication angle which is composed of the first communication angle and the second communication angle.

15 Claims, 1 Drawing Sheet

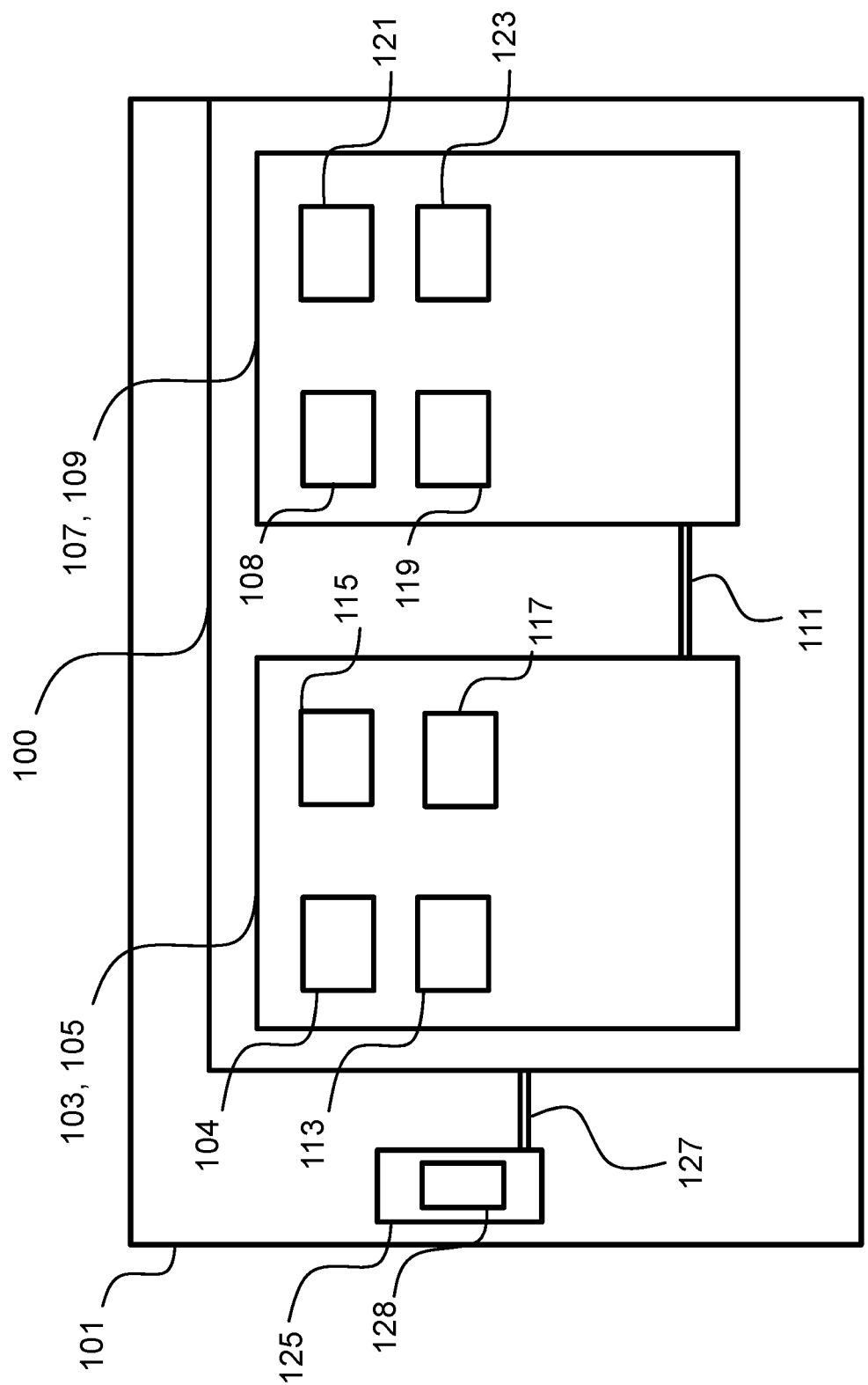

VEHICLE-TO-X COMMUNICATION SYSTEM

BACKGROUND

The present invention relates to a vehicle-to-X communication system and a vehicle which comprises such a vehicle-to-X communication system.

Vehicle-to-X communication (V2X) on the basis of IEEE 802.11p for vehicles is currently being introduced onto the market. Vehicle-to-X communication (V2X) improves the abilities of vehicles to communicate digitally with the aim of increasing safety for the participating road users and optimizing the flow of traffic. Vehicle-to-X communication comprises vehicle-to-vehicle communication (V2V) as well as vehicle-to-infrastructure communication (V2I). V2V communication allows information to be exchanged between various vehicles such as, for example, information about the position and speed of the relevant vehicles, in order to avoid accidents between the participating vehicles. V2I communication can provide vehicles with information about their driving environment such as, for example, traffic information or information about obstacles on a road.

The technological basis for a digitally networked vehicle is provided by a suitable V2X communication system for a vehicle. In this case, the vehicle comprises at least one electronic control unit (ECU) for controlling one or more electrical systems of the vehicle. The ECU is connected to an antenna. Up to now, such an antenna has typically been a so-called passive antenna which is exclusively configured for sending and receiving signals. Such a passive antenna does not, as a rule, have any additional integrated electronic components such as, for example, a micro controller for processing signals.

A further variant of an antenna which is preferably used in communication systems for vehicles is the use of a so-called smart antenna which has additional integrated electronic components such as, for example, transceiver components or an ECU, which are integrated inside a housing of this smart antenna. Such (smart) antennae are, as a rule, visibly mounted on a vehicle but this is not always desired by customers. In addition, the available space for installing such a (smart) antenna in a typical antenna position on the vehicle—such as, for instance, on the roof of a vehicle—is strictly limited. Such antennae are also known as so-called shark fin antennae in the prior art. Another negative aspect is that such a (smart) antenna has to be individually and separately adapted to each new vehicle body.

BRIEF SUMMARY

It is therefore the object of the present invention to provide an efficient concept for a vehicle-to-X communication system, which makes it possible to install the vehicle-to-X communication system on any vehicle and to adjust it thereto in a simple and space-saving manner, irrespective of the vehicle body and the vehicle shape of the vehicle used. A further object also involves providing an improved vehicle-to-X communication system, which makes it possible to adjust the signal radiation and signal coverage in a simple and, at the same, flexible manner for sending and receiving signals.

According to the invention, this object is achieved by the features of the independent claim. Advantageous embodiments of the present invention are the subject-matter of the dependent claims, the description and the figures.

According to a first aspect, the invention relates to a vehicle-to-X communication system for a vehicle, comprising a first communication module having a first antenna, wherein the first antenna has a first communication angle; a second communication module having a second antenna, wherein the second antenna has a second communication angle; wherein the first communication module and the second communication module are arranged in such a manner that the first antenna and the second antenna are oriented in different directions, in order to obtain a total communication angle which is composed of the first communication angle and the second communication angle.

The vehicle can, for example, be a motor vehicle, in particular a car, a truck, a motorcycle, an electric vehicle or a hybrid vehicle.

One advantage which is achieved by the present invention is that the vehicle-to-X communication system can be installed in any vehicle, irrespective of the vehicle body and the vehicle shape of the vehicle used, since the first antenna is an integrated part of the first communication module and the second antenna is an integrated part of the second communication module. Due to this integrated concept of the first communication module and of the second communication module it is possible to install and arrange the first communication module having the first antenna integrated therein and the second communication module having the second antenna integrated therein in any position inside the vehicle, without having to tackle technical limitations due to the lack of space inside a vehicle, which has, however, often been necessary up to now when installing (smart) antennae in a vehicle. For this reason, no additional or extensive adjustments are required to the vehicle-to-X communication system due to a specific vehicle body and the shape thereof. As a result, the vehicle-to-X communication system according to the invention can be installed in a simple and efficient way in various vehicles having different vehicle bodies, vehicle shapes and dimensions.

A further advantage is that, due to their flexibility for installation and arrangement in different positions inside the vehicle, the respective communication modules can preferably be installed in positions inside the vehicle, which are located close to or at least in the vicinity of electronic units and electronic devices, which are to be connected to the respective communication modules. This can also save on outlay for connection elements such as for instance cables, in order to connect the respective communication modules with the appropriate cables.

A further advantage which is achieved by the vehicle-to-X communication system according to the invention is that the signal radiation and the signal coverage of each of the two antennae can be simply and flexibly adapted for sending and receiving signals. This is achieved by the integrated concept of the vehicle-to-X communication system described above, since the installation of the first communication module and the second communication module, of which each module comprises at least one antenna, is not limited to a certain prescribed position inside the vehicle. Instead, the first communication module and the second communication module can each be arranged very flexibly inside the vehicle in order to fulfil changing technical requirements, if the vehicle-to-X communication system is installed, for example, in different types of vehicle. In addition, a desired signal radiation and signal coverage of each of the two antennae can be adjusted independently of the type of vehicle used or a vehicle body shape used, which is achieved by the increased flexibility in the arrangement of the respective communication modules of the vehicle-to-X communication system in the vehicle.

According to one embodiment of the present invention, the relevant communication angle is a radiation angle or a reception angle.

According to one embodiment of the present invention, the first communication angle and the second communication angle form communication angles of 180°, wherein the total communication angle is greater than 180° and less than or equal to 360°. As a result, the advantage is achieved that a preferred communication angle of the vehicle-to-X communication system can be easily adjusted for different type of vehicles, each having different dimensions and vehicle shapes.

According to one embodiment of the present invention, the first communication module comprises a first housing in which the first antenna is housed, and the second communication module comprises a second housing in which the second antenna is housed. As a result, the advantage is achieved that a so-called integrated first communication module and a so-called integrated second communication module can be constructed, which can each be easily arranged at different positions inside the vehicle. This allows for greater flexibility in the installation of the vehicle-X-communication system in vehicles having different vehicle dimensions and body shapes. An integrated first or second communication module can denote the fact that the respective first and second communication module contains certain components such as, for instance, an antenna and the respective communication module can be enclosed by an appropriate housing.

According to one embodiment of the present invention, the vehicle-to-X communication system comprises a first communication interface, wherein the first communication interface is configured to connect the first communication module and the second communication module to one another, in order to establish communication between the first communication module and the second communication module. The first communication interface can, in this case, be configured as a bidirectional communication interface. A data connection between the first communication module and the second communication module for exchanging data between the first communication module and the second communication module can be useful if synchronization of data is required. For this reason, a data connection between the first communication module and the second communication module is not required at any time that the first communication module and the second communication module are operated.

According to one embodiment of the present invention, the first communication interface is configured as a data bus system, preferably as a CAN bus system. Using a CAN bus system is particularly inexpensive.

According to one embodiment of the present invention, the first communication module comprises a first processing device for processing data, wherein the first processing device is configured such that it can be connected to the first antenna. As a result, the advantage is achieved that the first processing device can perform calculations with data which it has received from other components, which are installed inside or outside the first communication module of the vehicle-to-X communication system. This can be particularly useful if the first communication module is operated as a primary communication module and the second communication module is operated as a secondary communication module, wherein the secondary communication module is configured to transmit data to the primary communication module for further processing. Following processing of said data by the primary communication module, the processed data is sent back to the secondary communication module. It therefore makes sense to establish a data connection by means of the first communication point between the first communication module and the second communication module for this particular application. A further advantage is that the first communication module can process data independently of the second communication module and it can therefore be operated independently of the second communication module. The same of course applies in the reverse order.

According to one embodiment of the present invention, the first communication module comprises a first storage device for storing data, wherein the first storage device is preferably configured as a stack or as a part of a stack. As a result, the advantage is achieved that data which are exclusively generated and used by the first communication module can be stored in the first storage device, rendering the use of other or additional storage devices and their connection by means of a connection means such as, for example, a cable to the first communication module for storing the data of the first communication module superfluous.

According to one embodiment of the present invention, the first communication module comprises a first security device for backing up data. As a result, the advantage is achieved that the data of the first communication module can be encrypted and backed up in a particular way, for example, by using a different EAL (evaluation assurance level), which is different from an EAL which is used by other units or devices for encrypting data inside the vehicle-to-X communication system.

According to one embodiment of the present invention, the second communication module comprises a second processing device for processing data, wherein the second processing device is configured such that it can be connected to the second antenna. As a result, the advantage is achieved that the second communication module is capable of processing data independently of the first communication module, as a result of which the second communication module can also be operated independently of the first communication module. For applications where the first communication module is configured as a primary communication module and the second communication module is configured as a secondary communication module, the secondary communication module can be configured, for example, to perform a pre-processing of data before said data are transmitted to the primary or the first communication module for further processing. In this way, it is possible to reduce an overloading by data of the first data communication interface which is used to transfer data between the first communication module and the second communication module.

According to one embodiment of the present invention, the second communication module comprises a second storage device for storing data, wherein the second storage device is preferably configured as a stack or as a part of a stack. As a result, the advantage is achieved that data which are exclusively generated and used by the second communication module can be stored in the second storage device, rendering the use of other or additional storage devices and their connection by means of a connection means such as, for example, a cable to the second communication module for storing the data of the second communication module superfluous. In addition, the second storage device in the second communication module makes it possible to operate the second communication module independently of the first communication module, as the first storage device of the first communication module is not required for storing data of the second communication module.

According to one embodiment of the present invention, the second communication module comprises a second security device for backing up data. As a result, the advantage is achieved that the data of the second communication module can be encrypted and secured in a particular way, for example, by using a different EAL (evaluation assurance level), which is different from an EAL which is used by other units or devices for encrypting data inside the vehicle-to-X communication system.

According to one embodiment of the present invention, the first communication module and/or the second communication module can be connected by means of a second communication interface to a GNSS receiver module, in order to determine and provide an absolute position of the vehicle. The second communication interface can, in this case, be configured as a bidirectional communication interface. As a result, the advantage is achieved that either the first communication module and/or the second communication module can receive GNSS data such as, for example, GNSS position information or GNSS time information or satellite raw data, in order to determine an absolute position of the vehicle. For this purpose, the first communication module or the second communication module can have a suitable processing device or can be connected to a processing device, in order to be able to process GNSS data.

According to one embodiment of the present invention, the GNSS receiver module can be connected to a GNSS antenna. The GNSS antenna can, in this case, be a part of the GNSS receiver module. The GNSS antenna can also be installed at a position which differs from the position of the GNSS receiver module, in order to obtain a better signal coverage for the GNSS antenna. This makes it possible to achieve greater flexibility if the GNSS receiver module is installed inside the vehicle.

According to a second aspect, the invention relates to a vehicle having a vehicle-to-X communication system.

BRIEF DESCRIPTION OF THE DRAWINGS

Additional embodiment examples will be explained in more detail with reference to the appended FIGURE, wherein:

FIG. 1 shows a schematic illustration of a vehicle-to-X communication system for a vehicle according to one embodiment of the invention.

DETAILED DESCRIPTION

In the following detailed description reference is made to the appended drawings, which form part of this specification and which show specific embodiments in which the invention can be executed by way of illustration. It is understood that other embodiments can also be used and structural or logical changes can be made, without deviating from the concept of the present invention. The following detailed description is therefore not to be understood in a limiting sense. In addition, it is understood that the features of the various embodiment examples described herein can be combined with one another, unless otherwise specifically indicated.

FIG. 1 shows a vehicle-to-X communication system 100 for a vehicle 101, comprising a first communication module 103 having a first antenna 104, wherein the first antenna 104 has a first communication angle, a second communication module 107 having a second antenna 108, wherein the second antenna 108 has a second communication angle, wherein the first communication module 103 and the second communication module 107 are arranged in such a manner that the first antenna 104 and the second antenna 108 are oriented in different directions, in order to obtain a total communication angle which is composed of the first communication angle and the second communication angle.

According to another embodiment, the first communication angle of the first antenna 104 can be up to 180° and the second communication angle of the second antenna 108 can be up to 180°. The total communication angle of the first antenna 104 and of the second antenna 108 can, in this case, be greater than 180°. The total communication angle of the first antenna 104 and of the second antenna 108 can, however, also at the same time be less than or equal to 360°. The respective communication angle can be a radiation angle or a reception angle.

The first antenna 104 and the second antenna 108 can preferably be configured such that each of these antennae 104, 108 are substantially oriented parallel to a roadway on which the vehicle 101 is moving (not shown in FIG. 1), so that the maximum benefit of the signal coverage of the two antennae 104, 108 is preferably located in a horizontal position. The first antenna 104 and/or the second antenna 108 can, in each case, be configured as a PCB (printed circuit board) antenna, for cost saving reasons. The PCB antenna can also be a part of a main printed circuit board (not shown in FIG. 1).

According to another embodiment and as shown in FIG. 1, the first communication module 103 comprises a first housing 105 in which the first antenna 104 is housed, and the second communication module 107 comprises a second housing 109 in which the second antenna 108 is housed. Since each of the two communication modules 103, 107 is housed in housings which are different or separate from one another, the advantage is achieved that each of the two communication modules 103, 107 can be arranged at different positions inside the vehicle 101. In this way, greater flexibility with respect to signal coverage of the two antennae, 104, 108 around the vehicle 101 can be achieved. The vehicle 101 comprises, as shown in FIG. 1, two communication modules 103, 107 in order to be able to achieve a total and maximum signal coverage of 360°.

In addition, the design of the vehicle-to-X communication system 100 can be similar to a design which is known, for example, from the field of radar sensor technology. In the case of a radar sensor, the antenna is integrated in the housing of an electronic control unit (ECU). In this way, a so-called integrated radar sensor is obtained, for which no further adjustments to a vehicle are necessary, since the antenna is configured in such a way that such an antenna works independently of a vehicle body shape in which the radar sensor having the integrated antenna is arranged.

In one embodiment of the vehicle-to-X communication system 100, each of the two communication modules 103, 107 can preferably be operated as a standalone communication module. This means that the first communication module 103 and the second communication module 107 can be operated independently of each other. This can, for example, mean that the first communication module 103 comprises a first storage device 115 which can be a stack or a part of a stack. The second communication module 107 can comprise a second storage device 121 which, in the same way, can likewise be a stack or a part of a stack. Both stacks of the communication modules 103, 107 can, in each case, be operated independently of each other. Each of the communication modules 103, 107 can respectively emit signals and messages, for example messages of the BSM, CAM or DENM type, and indeed independently of the other communication module 103, 107.

Due to the different signal coverage of the first antenna 104 of the first communication module 103 and of the second antenna 108 of the second communication module 107 respectively, there are not, as a rule, any negative consequences with regard to possible signal interference if the first communication module 103 and the second communication module 107 send their respective messages independently of each other. This means that events can definitely occur, in which the respective messages can be sent by the two communication modules 103, 107 simultaneously or virtually simultaneously.

If, however, there is a risk of signal interference due to an installation site of the first communication module 103 and of the second communication module 107 inside the vehicle 101, the first communication module 103 and the second communication module 107 can be automatically synchronized with one another in order to send their respective messages alternately. To this end, the vehicle-to-X communication system 100 can have a first communication interface 111, as shown in FIG. 1.

The first communication interface 111 is configured to connect the first communication module 103 and the second communication module 107 in order to establish communication between the first communication module 103 and the second communication module 107, should this be required. The first communication interface 111 is configured as a data bus system which can preferably be a CAN bus system, because it constitutes a robust and inexpensive bus system.

In this context, it is pointed out that a synchronization of both communication modules 103, 107 can also be required to avoid signal interference if the communication angle of the first antenna 104 and/or the communication angle of the second antenna 108 is greater than 180 degrees. Another method for synchronizing both communication modules 103, 107 is described in detail in the published document WO 2015/121404 A1.

The first communication module 103 and the second communication module 107 can each comprise features which differ from one another so that they are suitable for dealing with different tasks. For example, the second communication module 107 can be configured to merely carry out simple or basic arithmetic operations whereas, on the other hand, the first communication module 103 can be configured to perform much more extensive arithmetic operations. To this end, the second communication module 107 can be configured as a secondary communication module or as a supplementary module which sends data and messages for further processing by means of the first communication interface 111 to the first communication module 103 which is configured as a primary communication module. The secondary or second communication module 107 can, to this end, initially perform a pre-processing of the data in order to minimize an overload of the first communication interface 111 by a data load which is to be transferred by means of the first communication interface 111 to the primary or the first communication module 103.

The functionality of the first communication module 103 and of the second communication module 107 can, in each case, be extended by technical devices which can be connected by means of communication technology to these communication modules 103, 107. These technical devices can, in this case, be installed in the interior of the vehicle 101 and, in addition, in the first housing 105 of the first communication module 103 and/or in the second housing 109 of the second communication module 107. However, some of these technical devices can also be arranged outside the first housing 105 and the second housing 109, but inside the vehicle 101. Various embodiments of the first communication module 103 and of the second communication module 107 are explained in greater detail below with reference to FIG. 1:

FIG. 1 shows a vehicle-to-X communication system 100 having a first communication module 103 and a second communication module 107. The first communication module 103 comprises a first processing device 113 for processing data.

The processing of data by the first processing device 113 can, in this case, mean: the first processing device 113 can, for example, be configured to receive data for processing from the first antenna 104 or another unit, which can be connected to the first processing device 103. Said data can be transmitted, for example, by the second communication module 107 and/or by a GNSS receiver module and/or by a GNSS antenna for calculating an absolute position of the vehicle 101 and/or by a unit or device inside the first communication module 103 and/or, very generally, by a data-sending unit which is installed inside or outside the vehicle 101.

The processing of data by the first processing device 113 can additionally mean that the first processing device 113 is configured to transmit data, which have previously been processed by the first processing device 113, to a communication unit which is located inside or outside the vehicle 101 or to the second communication module 107 and/or to a storage device and/or to a GNSS receiver module and/or to an additional antenna.

The first processing device 113 is configured such that it can be connected to the first antenna 104. As shown in FIG. 1, the first antenna 104 is arranged inside the first communication module 103. The first processing device 113 can additionally provide computing power for processing data.

The first communication module 103 additionally comprises a first storage device 115 for storing data, wherein the first storage device 115 is preferably configured as a stack or as a part of a stack. The data stored in the first storage device 115 are preferably data which have been or are being processed by the first processing device 113. However, the first storage device 115 can also receive data from other units or devices for storage, for example data which have been sent by the second communication module 107 or, more generally, by units which are installed inside and/or outside the second communication module 107.

As shown by FIG. 1, the first communication module 103 additionally comprises a first security device 117 for backing up and encrypting data. The first security device 117 can, in this case, receive data transmitted by units or devices which are located inside and/or outside the first communication module 103. For example, the first security device 117 can be configured to encrypt data which have been processed by the first processing device 113 in a previous step and before said processed data are sent to other units and devices such as, for instance, to the first antenna 104 and/or to the first storage device 115 and/or to the second communication module 107. However, the first security device 117 is also able to encrypt data which have previously been transmitted, for example, by the second communication module 107 to the first security device 117. In this way, it can be ensured that processed data are transmitted by the first communication module 103 in an encrypted and therefore secure way to other devices.

According to a first embodiment of the second communication module 107 and as shown in FIG. 1, the second communication module 107 additionally comprises a second processing device 119 for processing data. The second processing device 119 can additionally provide computing power for processing data. As additionally shown in FIG. 1, the second processing device 119 can be connected by means of communication technology to the second antenna 108 which is installed inside the second communication module 107.

The data processing by the second processing device 119 can additionally mean: the second processing device 119 can, for instance, be configured to receive data for data processing from the second antenna 108 or from another unit such as, for example, the first communication module 103 and/or from a GNSS receiver module and/or from a GNSS antenna in order to determine an absolute position of the vehicle 101 and/or from another unit which is installed inside the second communication module 107 or connected by means of communication technology to this and/or, very generally, from a unit which is installed inside or outside the vehicle 101.

The data processing by the second processing device 119 can additionally mean that the second processing device 119 is configured to transmit data which have been processed by the second processing device 119 to units which are connected by means of communication technology to the second processing device 119 such as, for instance, to the first communication module 103 or a storage device or another antenna (not shown in FIG. 1).

As additionally shown in FIG. 1, the second communication module 107 comprises a second storage device 121 which is preferably configured as a stack or as a part of a stack. The data stored in the second storage device 121 can be data which have been processed by the second processing device 119. The second storage device 121 can, however, also receive data from other units, which are installed inside and/or outside the second communication module 107, for storage.

The second communication module 107, as shown in FIG. 1, additionally comprises a second backing-up device 123 for backing up and encrypting data. The second backing-up device 123 can, in this case, receive data from units which are installed inside and/or outside the second communication module 107. For example, the second backing-up device 123 can be configured to encrypt data which have been processed by the second processing device 119 before said data are transmitted to other units such as, for instance, to the second antenna 108, to the second storage device 121 or to the first communication module 103. In this way, it can be ensured that data are transferred in a secure manner by the second communication module 107.

As already mentioned, the first communication module 103 and the second communication module 107 can each have a security device 117, 123. For this reason, each communication module 103, 107 must have an appropriate security certificate.

Another possible way of dealing with security certificates can involve the first communication module 103 only receiving new security certificates, if the latter is configured as a primary communication module.

In this way, the vehicle-to-X communication system 100 can then be regarded or interpreted by other units, which are connected or become connected to the vehicle-to-X communication system 100 by means of communication technology, from outside as a single communication module. The primary communication module 103 can, in this case, comprise a so-called long-term security certificate and can, in this case, be in a position, if necessary, to distribute additional security certificates to the secondary communication module 107. Such a distribution of security certificates can take place by means of a secured data connection such as, for example, by using symmetrical cryptographic technology. The first or primary communication module 103 encodes the relevant security certificates before these are transmitted to the second communication module 107. The secondary communication module 107 decodes the security certificates received before these are, in turn, encrypted, for example deposited in the second security device 123 or in the second storage device 121 by means of a so-called hardware security module (HSM). The encryption of the security certificates can take place in accordance with an EAL (evaluation assurance level). It is, however, entirely possible that the security certificates are encrypted for the second communication module 107 with a lower EAL than the encryption of the security certificates for the primary communication module 103 which may possibly require a higher EAL, in the event that only the primary communication module 103 contains the long-term security certificates. In this way, the situation is achieved that the storage device of the second communication module 107 can have smaller dimensions for storing security certificates, since the second communication module 107 only contains the current security certificates and, where appropriate, also the security certificate which is subsequently required, in its memory.

In a second embodiment of the second communication module 107, which is not shown in FIG. 1, the second communication module 107 can also comprise only one storage device 121 and a second processing device 119 for processing data. In one such embodiment, messages which are sent by the second communication module 107 can be generated in this application first of all by the first communication module 103, since only the first communication module 103 has a suitable security device. After creating the appropriate messages, these are transmitted by means of the first communication interface 111 to the second communication module 107 which subsequently transfers these messages to the second antenna 108.

In the event that the second communication module 107 receives messages by means of the second antenna 108, these messages must first of all be sent for the corresponding verification (verification on demand) by the second communication module 107 to the first communication module 103. The advantage of the second embodiment of the second communication module 107 is that only low costs are incurred for installation and operation.

In a third embodiment of the second communication pulse 107, which is not shown in FIG. 1, the second communication module 107 does not comprise a second antenna 108. As a result, however, an open and technically upgradeable platform can be provided, which makes possible greater flexibility for different application scenarios of the second communication module 107.

In another embodiment of the invention, which is not shown in FIG. 1, it is also possible that the vehicle-to-X communication system 100 only comprises a single communication module, for example the first communication module 103 without the second communication module 107. The first communication module 103 then comprises the first antenna 104 and can then be connected to an additional second antenna by means of a connection means, for example a high-frequency cable. Such an embodiment can be preferred if the installation site of the second antenna makes it possible to use short cable connections. An example of an installation site of one such embodiment can be a mirror of a vehicle which does not have a second row of seats or a trunk, since the second antenna can be installed directly on the back of the cab of the vehicle in such a vehicle.

In another embodiment of the invention, the first communication module 103 and/or the second communication module 107 can be configured such that the respective antenna for the respective communication module 103,107 is an integral part of a printed circuit board.

In a first example of an application of a so-called integrated communication module (not shown in FIG. 1), the first communication module 103 is arranged in the environment of a rear-view mirror of a vehicle. The second communication module 107 is, in this case, arranged in the environment of the rear light of a vehicle. The first communication module 103 and the second communication module 107 can be connected to one another by means of a CAN bus system, wherein the cable for the CAN bus system can be installed between the vehicle roof and the headliner of the vehicle.

In a second example of an application of a so-called integrated communication module (not shown in FIG. 1), the vehicle-to-X communication system 100 comprises a first communication module 103 which is installed in the environment of a rear-view mirror of a vehicle. The first communication module 103 comprises a connection for a second antenna. The second antenna is installed in the environment or in the surroundings of an upper brake light of the vehicle, wherein a cable which is routed between a vehicle roof and a headliner of the vehicle, connects the second antenna by means of communication technology to the first communication module. It is hereby worth mentioning, in this context, that a so-called integrated communication module means that it is part of the vehicle-to-X communication system.

In the event that the vehicle-to-X communication system 100 is installed in a motorcycle, a single communication module would also be sufficient because it is particularly important to a motorcycle rider to be detected in good time, and it is therefore important that the antenna used sends out the signals in a direction in which the motorcycle is moving forward. Thanks to the use of an antenna inside a single communication module which is, in turn, housed in a suitable housing, it is substantially easier to design a waterproof housing for the vehicle-to-X communication system 100 for use in a motorcycle.

Various advantages can be achieved by using an integrated communication module 103 having a first antenna 104 and an integrated second communication module 107 having a second antenna 108:

A first advantage is that the communication modules used can be standardized more simply, making it possible to install the vehicle-to-X communication system 100 in an extremely wide range of vehicles, without having to adapt the vehicle-to-X communication system 100 or even the respective vehicle or having to make extensive adjustments.

A further advantage is that the vehicle-to-X communication system 100 according to the invention has a reduced complexity with respect to the number of transceiver components units used compared with the otherwise standard use of diversity transceiver components. This reduces the manufacturing costs of the vehicle-to-X communication system 100.

A further advantage is that an installation of the vehicle-to-X communication system 100 in a vehicle is not immediately visible for a vehicle user, since its components can be arranged at positions inside the vehicle which are normally inaccessible or difficult to access for the vehicle user.

The vehicle-to-X communication system 100 can, furthermore, be configured to determine an absolute position of the vehicle 101. This will be explained below:

In a first embodiment example, in order to provide and determine an absolute position of the vehicle 101 and, as shown in FIG. 1, a GNSS receiver module 125 having a GNSS antenna 128 is arranged in the interior of the vehicle 101. The GNSS receiver module 125 can be connected by means of a second communication interface 127 to the vehicle-to-X communication system 100. In this first embodiment, the GNSS receiver module 125 can be connected to the first communication module 103 and/or to the second communication module 107 by means of communication technology. The advantage of this is that neither the first communication module 103 nor the second communication module 107 requires a separate GNSS receiver module. The second communication interface 127 can be configured as a suitable bus system.

In a second embodiment example, in order to provide and determine an absolute position of the vehicle 101, which is however not shown in FIG. 1, either the first communication module 103 or the second communication module 107 can comprise a GNSS receiver module 125 which can be connected to a GNSS antenna 128, for example by means of a high-frequency cable. The position of the GNSS antenna 128 can differ from the position of the respective communication module 103, 107. In this second embodiment example, the first communication module 103 or the second communication module 107 can obtain direct and rapid access to the absolute position of the vehicle 101 determined by the GNSS receiver module 125.

In a third embodiment example, in order to determine an absolute position of the vehicle 101, which is not shown in FIG. 1, the first communication module 103 or the second communication module 107 comprises a GNSS receiver module 125 having an integrated GNSS antenna 128. The first communication module 103 and/or the second communication module 107 can, as a result, each directly and rapidly access the absolute position of the vehicle 101 calculated by the GNSS receiver module 125.

In a fourth embodiment example, in order to determine an absolute position of the vehicle 101, which is not shown in FIG. 1, the first communication module 103 and the second communication module 107 respectively comprise a first GNSS receiver module 125 and an integrated GNSS antenna 128.

The second communication module 107 can, if it is operated as a secondary communication module, also be configured to transfer satellite raw data to the first communication module 103 if the latter is operated as a primary communication module. The first communication module 103 can be configured to determine the absolute GNSS position of the vehicle 101 on the basis of the satellite raw data of the GNSS receiver module of the first communication module 103 and the GNSS receiver module of the second communication module 107. In this specific embodiment, preferably at least one GNSS antenna is installed in each of the communication modules 103, 107 which can point in the same direction as the first antenna 104 and the second antenna 108.

It should be mentioned at this point that the processing of GNSS data such as, for example, satellite raw data can also be carried out or at least supported by the previously described embodiments of the vehicle-to-X data communication system 100 in order to provide an absolute position of the vehicle 101. In this context, the first communication module 103 can comprise a first processing device 113 and/or the second communication module 107 can comprise a second processing device 119 in order to provide support during the determination of an absolute position of the vehicle 101.

The installation site for an installation of the first communication module 103 and the second communication module 107 inside the vehicle 101 can depend on the respective application of the vehicle-to-X communication system 100 and, therefore, differ depending on the application scenario. Preferred locations for the installation of the vehicle-to-X communication system 100 inside the vehicle 100 and which are not shown in FIG. 1 are preferably positions in which radar sensors or camera sensors are installed. Further examples of possible installation positions are, for example, on the windscreen around the rear-view mirror inside the vehicle cell of the vehicle 101 or inside the side mirrors of the vehicle 101 or inside the bumpers of the vehicle 101 or behind an emblem of the manufacturer of the vehicle 101 or behind a ventilation grille of the vehicle 101 or in the region of a brake light or on a rear window on the inside of a cabin of the vehicle 101 or on a combination thereof. However, the position for an installation is not limited to these examples and, therefore, other or additional installation sites of the first communication module 103 and of the second communication module 107 inside the vehicle 101 can be considered.

Another possible way of installing the first communication module 103 and the second communication module 107 consists of a combination with a housing which includes a surround view camera, in order to save on installation space and equipment for connecting to other devices.

Another aspect with respect to the vehicle-to-X communication system 100 is that the first communication module 103 and/or the second communication module 107 can be configured to handle messages which are received multiple times by a single transmitting unit.

This can particularly occur if messages are received from infrastructure equipment, for example from traffic lights or by receiving reflections caused by the infrastructure. In order to ensure that a received message is only used once by the respective communication module, a so-called association of the received message or messages is carried out by the first communication module 103 and/or the second communication module 107 before the received messages are processed accordingly by other applications. In order to carry out the association, it may be useful for an identification number of the respective message to be used and/or checked by the first communication module 103 and/or the second communication module 107. The method for an association can, in this case, include the following steps:

In a first step a message is received by the first communication module 103 and the second communication module 107.

The second step comprises a pre-processing of the received message by the first communication module 103 and the second communication module 107.

The third step 103 comprises sending of the received and pre-processed message by the second communication module 107 to the first communication module 103.

The fourth step comprises an association or an allocation of the received message by the first (primary) communication module 103.

The fifth step comprises the calculation of the data on the basis of the allocated message in the first communication module 103.

LIST OF REFERENCE NUMERALS

100 Vehicle-to-X communication system
101 Vehicle
103 First communication module
104 First antenna
105 First housing
107 Second communication module
108 Second antenna
109 Second housing
111 First communication interface
113 First processing device
115 First storage device
117 First security device
119 Second processing device
121 Second storage device
123 Second security device
125 GNSS receiver module
127 Second communication interface
128 GNSS antenna

The invention claimed is:

1. A vehicle-to-X communication system for a vehicle, comprising:
   a first communication module having a first antenna, wherein the first antenna has a first communication angle;
   a second communication module having a second antenna, wherein the second antenna has a second communication angle;
   wherein the first communication module and the second communication module are arranged in such a manner that the first antenna and the second antenna are oriented in different directions, in order to obtain a total communication angle which is composed of the first communication angle and the second communication angle;
   wherein the first communication module and the second communication module are automatically synchronized with one another to send their respective messages alternately when an installation site of the first communication module inside the vehicle combined with an installation site of the second communication module inside the vehicle cause the first communication angle and the second communication angle to produce a risk of signal interference;
   wherein the first communication module and the second communication module respectively emit signals and messages independently of the other;
   wherein the first communication module comprises a first housing in which the first antenna, a first processing device, a first storage device, and a first security device are housed, and wherein the second communication module comprises a second housing in which the second antenna, a second processing device, a second storage device, and a second security device are housed; and wherein the first communication module is configured as a primary communication module that receives new security certificates, the second communication module is configured as a secondary communication module, and the primary communication module distributes a plurality of additional security certificates to the secondary communication module, which encrypts and stores the additional security certificates at an evaluation assurance level (EAL) that is lower than an encryption EAL of the security certificates for the primary communication module thereby reducing an amount of available storage needed at the secondary communication module.

2. The vehicle-to-X communication system according to claim 1, wherein the respective communication angle is a radiation angle or a reception angle.

3. The vehicle-to-X communication system according to claim 1, wherein the first communication angle and the second communication angle form communication angles of 180°, wherein the total communication angle is greater than 180° and less than or equal to 360°.

4. The vehicle-to-X communication system according to claim 1, comprising a first communication interface, wherein the first communication interface is configured to connect the first communication module and the second communication module to one another, in order to establish a communication between the first communication module and the second communication module.

5. The vehicle-to-X communication system according to claim 4, wherein the first communication interface is configured as a data bus system.

6. The vehicle-to-X communication system according to claim 1, wherein the first communication module comprises a first processing device for processing data, wherein the processing device is configured such that it can be connected to the first antenna.

7. The vehicle-to-X communication system according to claim 1, wherein the first communication module comprises a first storage device for storing data.

8. The vehicle-to-X communication system according to claim 1, wherein the first communication module and/or the second communication module can be connected by a second communication interface to a GNSS receiver module in order to provide an absolute position of the vehicle.

9. The vehicle-to-X communication system according to claim 8, wherein the GNSS receiver module can be connected to a GNSS antenna.

10. A vehicle which comprises a vehicle-to-X communication system including:
a first communication module having a first antenna, wherein the first antenna has a first communication angle;
a second communication module having a second antenna, wherein the second antenna has a second communication angle;
wherein the first communication module and the second communication module are arranged in such a manner that the first antenna and the second antenna are oriented in different directions, in order to obtain a total communication angle which is composed of the first communication angle and the second communication angle;
wherein the first communication module and the second communication module are automatically synchronized with one another to send their respective messages alternately when an installation site of the first communication module inside the vehicle combined with an installation site of the second communication module inside the vehicle cause the first communication angle and the second communication angle to produce a risk of signal interference;
wherein the first communication module and the second communication module respectively emit signals and messages independently of the other;
wherein the first communication module comprises a first housing in which the first antenna, a first processing device, a first storage device, and a first security device are housed, and wherein the second communication module comprises a second housing in which the second antenna, a second processing device, a second storage device, and a second security device are housed; and
wherein the first communication module is configured as a primary communication module that receives new security certificates, the second communication module is configured as a secondary communication module, and the primary communication module distributes a plurality of additional security certificates to the secondary communication module, which encrypts and stores the additional security certificates at an evaluation assurance level (EAL) that is lower than an encryption EAL of the security certificates for the primary communication module thereby reducing an amount of available storage needed at the secondary communication module.

11. The vehicle of claim 10, wherein the vehicle-to-X communication system further comprises a first communication interface, wherein the first communication interface is configured to connect the first communication module and the second communication module to one another, in order to establish a communication between the first communication module and the second communication module, wherein the first communication interface is configured as a data bus system.

12. The vehicle of claim 11, wherein the first communication module and/or the second communication module can be connected by a second communication interface to a GNSS receiver module in order to provide an absolute position of the vehicle, wherein the GNSS receiver module can be connected to a GNSS antenna.

13. The vehicle-to-X communication system according to claim 5, wherein the data bus system is a CAN bus system.

14. The vehicle-to-X communication system according to claim 7, wherein the first storage device is configured as a stack or as a part of a stack.

15. The vehicle-to-X communication system according to claim 1, wherein the second storage device is configured as a stack or as a part of a stack.

* * * * *